United States Patent
Sato et al.

(10) Patent No.: US 10,598,888 B2
(45) Date of Patent: Mar. 24, 2020

(54) INTERMITTENT CONNECTION TYPE OPTICAL FIBER RIBBON HAVING IMPROVED DENSITY, MANUFACTURING METHOD OF THE RIBBON, OPTICAL FIBER CABLE, AND OPTICAL CABLE FIBER CODE

(71) Applicant: SUMITOMO ELECTRIC INDUSTRIES, LTD., Osaka-shi, Osaka (JP)

(72) Inventors: Fumiaki Sato, Yokohama (JP);
Yoshiaki Nagao, Yokohama (JP);
Nobuyuki Suzuki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 49 days.

(21) Appl. No.: 15/751,282

(22) PCT Filed: Feb. 17, 2017

(86) PCT No.: PCT/JP2017/006011
§ 371 (c)(1),
(2) Date: Feb. 8, 2018

(87) PCT Pub. No.: WO2017/145955
PCT Pub. Date: Aug. 31, 2017

(65) Prior Publication Data
US 2019/0204519 A1    Jul. 4, 2019

(30) Foreign Application Priority Data
Feb. 23, 2016   (JP) .................. 2016-031998

(51) Int. Cl.
*G02B 6/44*   (2006.01)
*G02B 6/36*   (2006.01)

(52) U.S. Cl.
CPC .......... *G02B 6/448* (2013.01); *G02B 6/3636* (2013.01); *G02B 6/44* (2013.01); *G02B 6/441* (2013.01);
(Continued)

(58) Field of Classification Search
CPC .............................. G02B 6/448; G02B 6/3636
(Continued)

(56) References Cited

U.S. PATENT DOCUMENTS 5,098,459 A * 3/1992 Fukuma ............... G02B 6/2835
385/51
5,530,782 A * 6/1996 Osaka .................... G02B 6/245
385/45

(Continued)

FOREIGN PATENT DOCUMENTS

JP    2003-232972 A    8/2003
JP    2003-241042 A    8/2003

(Continued)

*Primary Examiner* — Akm E Ullah
(74) *Attorney, Agent, or Firm* — Faegre Drinker Biddle & Reath LLP

(57) ABSTRACT

There is provided an intermittent connection type optical fiber ribbon in which at least a part of a plurality of optical fibers that are arranged to be in parallel come into contact with each other, and between a part or the entirety of the optical fibers, a connection portion at which the adjacent optical fibers are connected to each other with an adhesive resin, and a non-connection portion at which the adjacent optical fibers are not connected to each other with the adhesive resin, are intermittently provided in the longitudinal direction, in which an outer diameter dimension of the optical fiber is equal to or less than 0.22 mm, and an inter-center distance of the adjacent optical fibers is (Continued)

0.20±0.02 mm, and in which at least a part of the outer periphery of the optical fiber has no adhesive resin attached thereto.

12 Claims, 14 Drawing Sheets

(52) U.S. Cl.
CPC ......... *G02B 6/4403* (2013.01); *G02B 6/4405* (2013.01); *G02B 6/4482* (2013.01)

(58) Field of Classification Search
USPC .......................................................... 385/114
See application file for complete search history.

(56) References Cited

U.S. PATENT DOCUMENTS

| | | | |
|---|---|---|---|
| 6,275,642 B1* | 8/2001 | Pouyez | G02B 6/2558 |
| | | | 385/137 |
| 9,116,321 B2* | 8/2015 | Sato | G02B 6/4403 |
| 9,995,896 B2* | 6/2018 | Namazue | G02B 6/4403 |
| 10,107,980 B1* | 10/2018 | Debban | G02B 6/4404 |
| 10,247,900 B2* | 4/2019 | Murata | B29D 11/00721 |
| 10,488,609 B2* | 11/2019 | Sato | G02B 6/4409 |
| 2005/0226573 A1 | 10/2005 | Okuno et al. | |
| 2008/0310803 A1* | 12/2008 | Franke | G02B 6/287 |
| | | | 385/115 |
| 2012/0275753 A1* | 11/2012 | Reinhardt | G02B 6/4495 |
| | | | 385/135 |
| 2016/0161692 A1* | 6/2016 | Namazue | G02B 6/4403 |
| | | | 385/114 |
| 2017/0115461 A1 | 4/2017 | Namazue et al. | |
| 2017/0184803 A1 | 6/2017 | Namazue et al. | |
| 2018/0321454 A1* | 11/2018 | Sato | G02B 6/44 |
| 2019/0011656 A1* | 1/2019 | Sato | G02B 6/44 |

FOREIGN PATENT DOCUMENTS

| | | |
|---|---|---|
| JP | 2007-279226 A | 10/2007 |
| JP | 2010-26228 A | 2/2010 |
| JP | 2012-208310 A | 10/2012 |
| JP | 2013-88617 A | 5/2013 |
| JP | 2013-88619 A | 5/2013 |
| WO | WO-03/100495 A1 | 12/2003 |

* cited by examiner

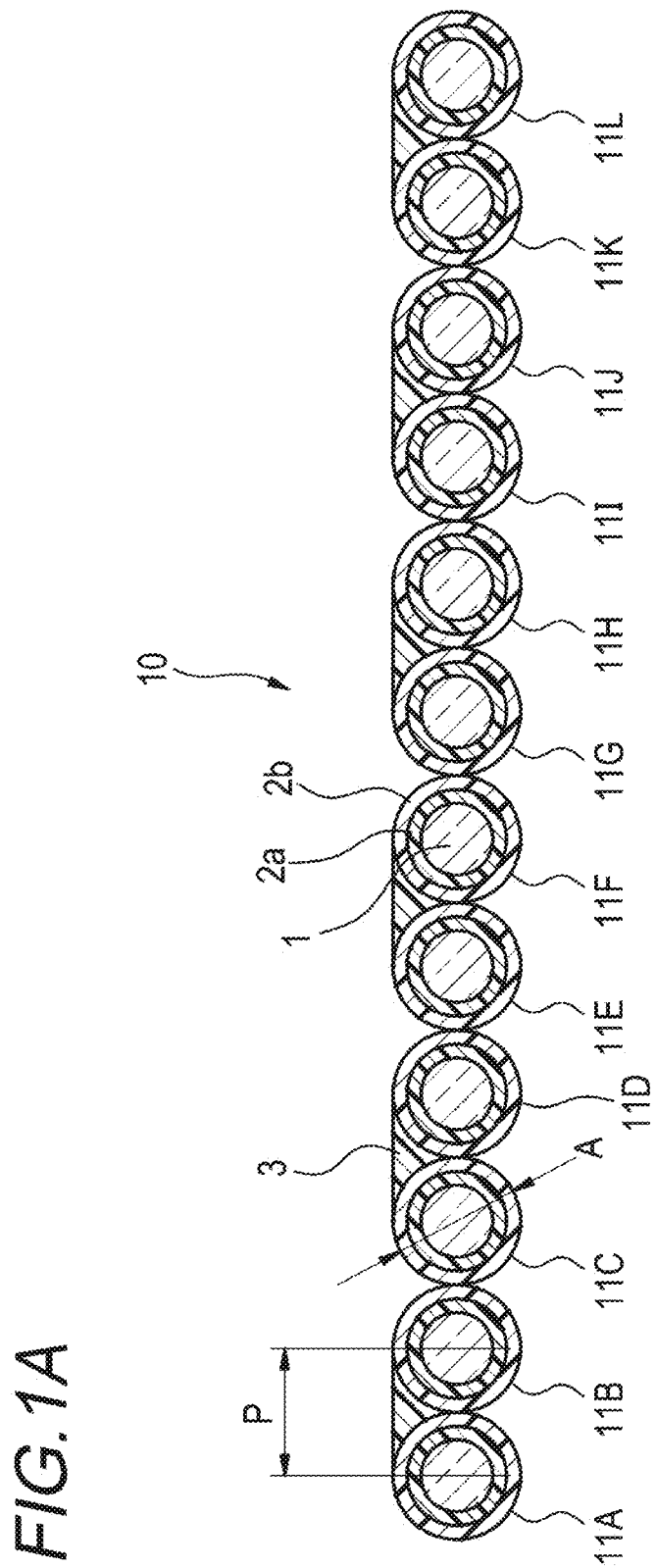

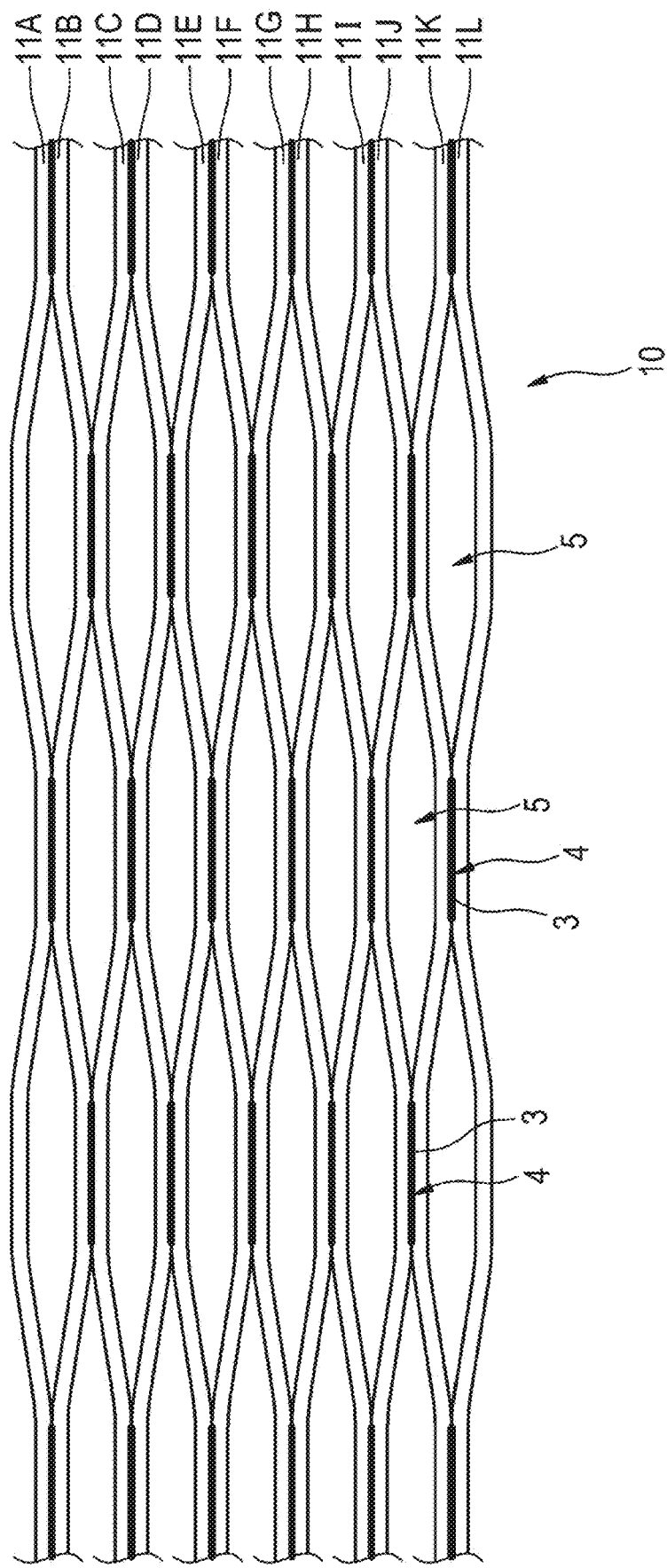

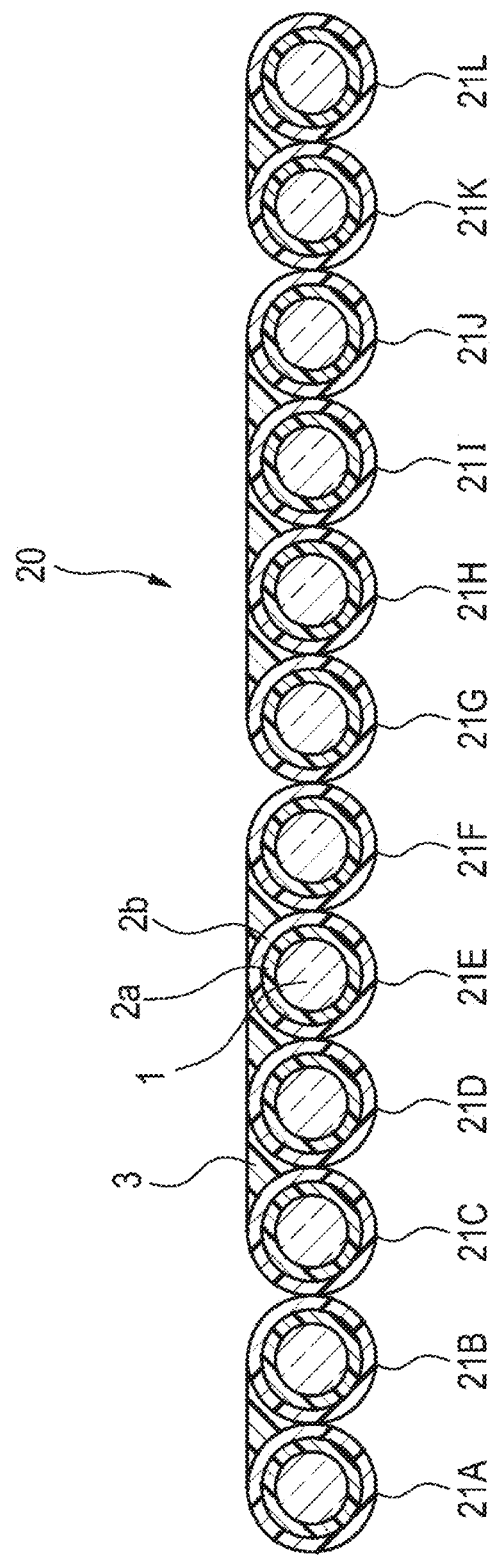

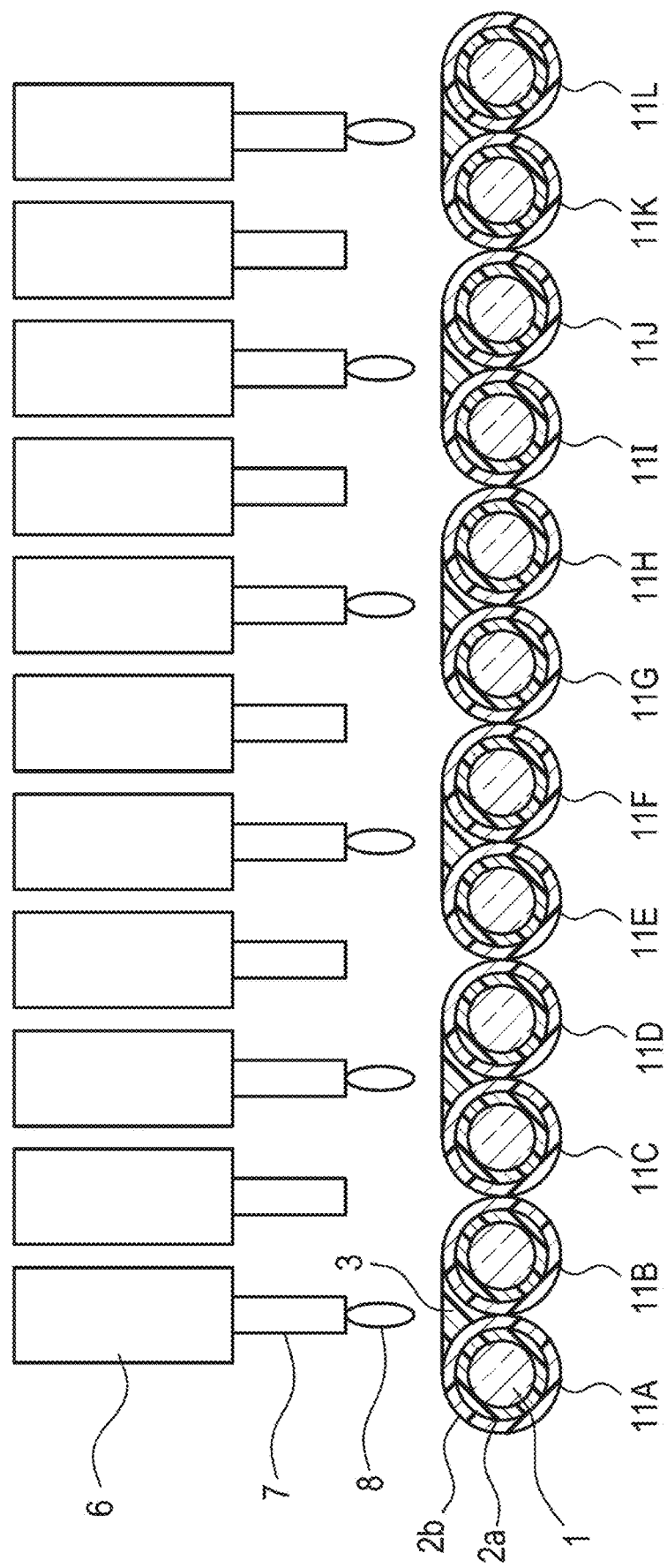

excellent# INTERMITTENT CONNECTION TYPE OPTICAL FIBER RIBBON HAVING IMPROVED DENSITY, MANUFACTURING METHOD OF THE RIBBON, OPTICAL FIBER CABLE, AND OPTICAL CABLE FIBER CODE

TECHNICAL FIELD

The present invention relates to an intermittent connection type optical fiber ribbon, a manufacturing method of an intermittent connection type optical fiber ribbon, an optical fiber cable, and an optical fiber code.

The present application is based on Japanese Patent Application No. 2016-031998 filed on Feb. 23, 2016, and the content thereof is incorporated herein by reference.

BACKGROUND ART

In PTL 1, an intermittent connection type optical fiber ribbon in which a connection portion at which adjacent optical fibers are connected to each other with an adhesive resin, and a non-connection portion at which the adjacent optical fibers are not connected to each other with the adhesive resin, are intermittently provided in a longitudinal direction, in a state where a plurality of optical fibers are arranged to be in parallel, is described.

BACKGROUND ART DOCUMENTS

Patent Documents

Patent Document 1: JP-A-2013-88617

SUMMARY OF INVENTION

According to an aspect of the present invention, there is an intermittent connection type optical fiber ribbon in which at least a part of a plurality of optical fibers in a state of being arranged to be in parallel come into contact with each other, and between a part or the entirety of the optical fibers, a connection portion at which the adjacent optical fibers are connected to each other with an adhesive resin, and a non-connection portion at which the adjacent optical fibers are not connected to each other with the adhesive resin, are intermittently provided in the longitudinal direction, in which an outer diameter dimension of the optical fiber is equal to or less than 0.22 mm, and an inter-center distance of the adjacent optical fibers is 0.20±0.03 mm.

According to another aspect of the present invention, there is provided an optical fiber cable including: a cylindrical tube; and the plurality of intermittent connection type optical fiber ribbons, in which the plurality of intermittent connection type optical fiber ribbons are covered with the tube.

According to still another aspect of the present invention, there is provided an optical fiber cable including: a slot rod including a plurality of slot grooves; and the plurality of intermittent connection type optical fiber ribbons, in which the plurality of intermittent connection type optical fiber ribbons are respectively accommodated in the slot grooves.

According to still another aspect of the present invention, there is provided an optical fiber code including: a jacket; and the intermittent connection type optical fiber ribbon, in which the intermittent connection type optical fiber ribbon is covered with the jacket.

A manufacturing method of an intermittent connection type optical fiber ribbon is for manufacturing the intermittent connection type optical fiber ribbon in which at least a part of a plurality of optical fibers in a state of being arranged to be in parallel come into contact with each other, and between a part or the entirety of the optical fibers, a connection portion at which the adjacent optical fibers are connected to each other with an adhesive resin, and a non-connection portion at which the adjacent optical fibers are not connected to each other with the adhesive resin, are intermittently provided in the longitudinal direction, the method including: a step of coating a surface of the optical fiber with marking for recognition by arranging the plurality of optical fibers to be in parallel; a step of coating the plurality of arranged optical fibers with the adhesive resin; a smoothing step of smoothing the adhesive resin used in coating; a step of providing the connection portion by hardening the adhesive resin; and a step of providing the non-connection portion by intermittently forming a slit in a longitudinal direction between a part or the entirety of optical fibers, from the surface opposite to the resin coated surface.

BRIEF DESCRIPTION OF DRAWINGS

FIG. 1A is a sectional view illustrating an example of an intermittent connection type optical fiber ribbon according to a first embodiment.

FIG. 1B is a plan view illustrating an example of the intermittent connection type optical fiber ribbon according to the first embodiment, and is a view illustrating a state where a non-connection portion is widened in an arrange direction.

FIG. 2A is a sectional view illustrating an example of an intermittent connection type optical fiber ribbon according to a second embodiment.

FIG. 3 is a view illustrating an example of a method for coating the intermittent connection type optical fiber ribbon according to the first embodiment with an adhesive resin.

DESCRIPTION OF EMBODIMENTS

Technical Problem

Figure 2B:
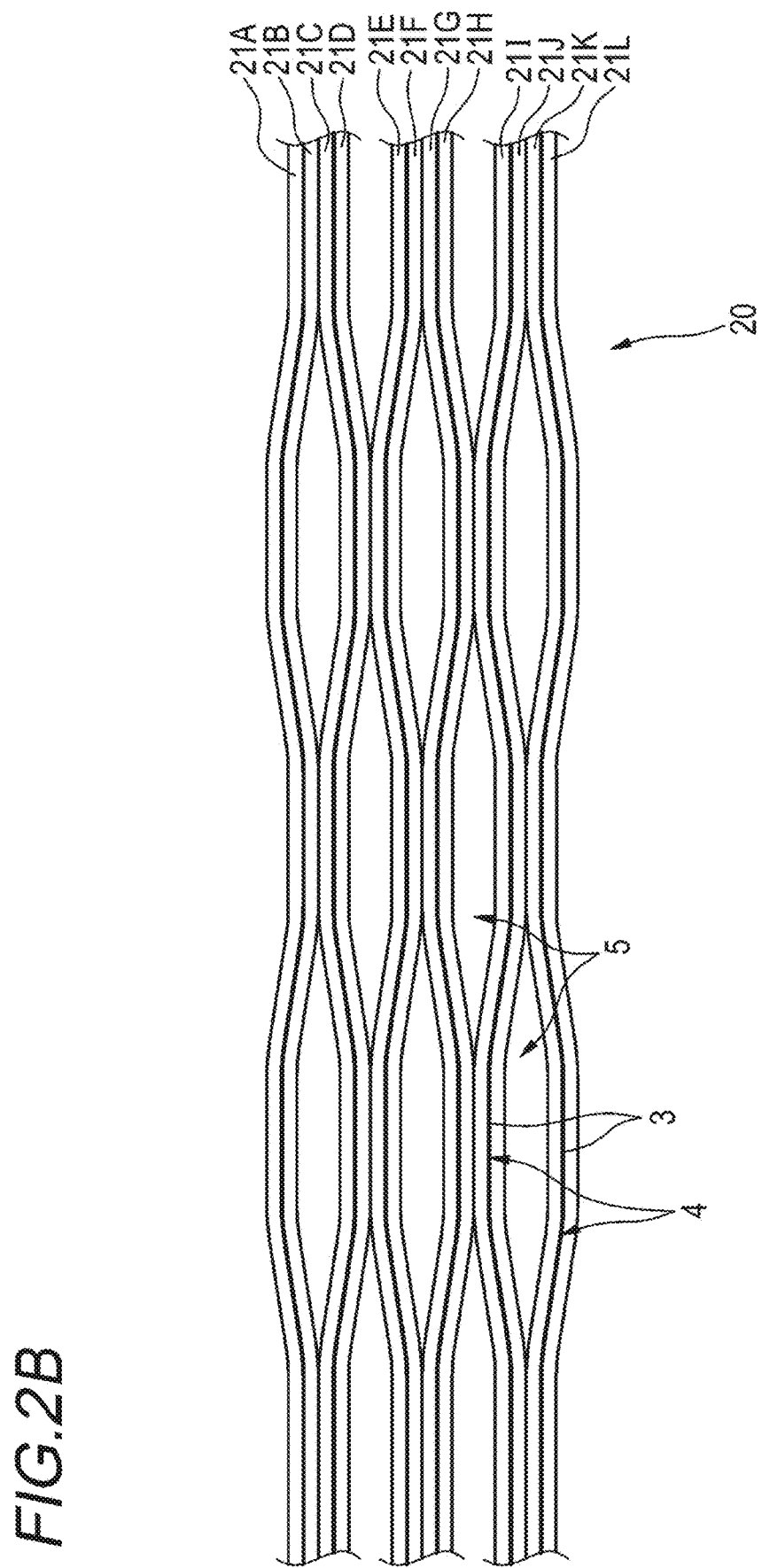
FIG. 2B is a plan view illustrating an example of the intermittent connection type optical fiber ribbon according to a second embodiment, and is a view illustrating a state where the non-connection portion is widened in the arrange direction.

When an intermittent connection type optical fiber ribbon is used as an optical fiber ribbon which is accommodated in an optical fiber cable or in an optical fiber code, it is possible to easily perform detaching of a desirable optical fiber at the time of intermediate branching.

In order to improve the density of the optical fiber cable or the optical fiber code which accommodates the intermittent connection type optical fiber ribbon having excellent workability at the time of intermediate branching therein as described above, it is detected that the outer diameter of the optical fiber which is used in the intermittent connection type optical fiber ribbon is generally 250 μm (0.25 mm) to 220 μm (0.22 mm) (for example, PTL 1).

However, in the intermittent connection type optical fiber ribbon described in PTL 1, since an adhesive resin exists between each of the optical fibers, it is not possible to reduce a space area in the optical fiber cable or in the optical fiber code, and to sufficiently improve the density of the optical fiber cable or the optical fiber code.

Here, an object of the disclosure is to provide an intermittent connection type optical fiber ribbon which can improve the density of an optical fiber cable and an optical fiber code, and an optical fiber cable and an optical fiber code which use the intermittent connection type optical fiber ribbon.

Advantageous Effects of Invention

According to the present invention, it is possible to provide an intermittent connection type optical fiber ribbon which can improve the density of an optical fiber cable and an optical fiber code, and an optical fiber cable and an optical fiber code which use the intermittent connection type optical fiber ribbon.

Description of Embodiments

First, embodiments of the present invention will be listed and described.

(1) An intermittent connection type optical fiber ribbon according to an embodiment of the present invention is an intermittent connection type optical fiber ribbon in which at least a part of a plurality of optical fibers in a state of being arranged to be in parallel come into contact with each other, and between a part or the entirety of the optical fibers, a connection portion at which the adjacent optical fibers are connected to each other with an adhesive resin, and a non-connection portion at which the adjacent optical fibers are not connected to each other with the adhesive resin, are intermittently provided in the longitudinal direction, in which an outer diameter dimension of the optical fiber is equal to or less than 0.22 mm, and an inter-center distance of the adjacent optical fibers is 0.20±0.03 mm.

In the intermittent connection type optical fiber ribbon of the above-described (1), at least a part of the adjacent optical fibers come into contact with each other, the outer diameter dimension of the optical fiber is equal to or less than 0.22 mm, and the inter-center distance of the adjacent optical fibers is 0.20±0.03 mm, and thus, it is possible to make a sectional area smaller than that of the intermittent connection type optical fiber ribbon of the related art, and to improve the density of the optical fiber cable or the optical fiber code when the intermittent connection type optical fiber ribbon is used in the optical fiber cable or in the optical fiber code.

(2) The thickness of the intermittent connection type optical fiber ribbon is equal to or less than 0.26 mm.

By suppressing the thickness of the intermittent connection type optical fiber ribbon so as to be equal to or less than 0.26 mm, it is possible to improve the density of the optical fiber cable or the optical fiber code.

(3) Marking is performed on at least one of the adhesive resin and the optical fiber.

Since the marking is performed on at least one of the adhesive resin and the optical fiber, it is possible to easily recognize the intermittent connection type optical fiber ribbon at the time of intermediate branching.

(4) The optical fiber includes a glass fiber and two covering layers which cover the glass fiber, and a Young's modulus of the inner covering layer of the two covering layers is equal to or less than 0.5 MPa.

Since the Young's modulus of the inner covering layer of the optical fiber is equal to or less than 0.5 MPa, it is possible to suppress deterioration of lateral pressure characteristics by making the thickness of the covering layer of the optical fiber thin.

(5) Only a side surface of the intermittent connection type optical fiber ribbon is coated with the adhesive resin.

Since the area coated with the adhesive resin is only a side surface of the intermittent connection type optical fiber ribbon, it is possible to suppress the sectional area of the connection portion with the adhesive resin so as to be small.

(6) An optical fiber cable according to an embodiment includes: a cylindrical tube; and the plurality of intermittent connection type optical fiber ribbons according to any one of the above-described (1) to (5), in which the plurality of intermittent connection type optical fiber ribbons are covered with the tube.

(7) An optical fiber cable includes: a slot rod including a plurality of slot grooves; and the plurality of intermittent connection type optical fiber ribbons according to any one of the above-described (1) to (5), in which the plurality of intermittent connection type optical fiber ribbons are respectively accommodated in the slot grooves.

In the optical fiber cables of the above-described (6) and (7), since the plurality of intermittent connection type optical fiber ribbons described in any one of the above-described (1) to (5) are mounted, it is possible to make the density higher than that of the optical fiber cable of the related art. In addition, depending on the same number of cores, it is possible to make the outer diameter thereof smaller than that of the optical fiber cable of the related art.

(8) An optical fiber code according to the embodiment of the present invention includes: a jacket; and the intermittent connection type optical fiber ribbon according to any one of the above-described (1) to (5), in which the intermittent connection type optical fiber ribbon is covered with the jacket.

It is possible to make the outer diameter of the optical fiber code smaller than that of the related art. In addition, it is possible to make the density of the optical fiber code higher than that of the related art.

(9) A manufacturing method of an intermittent connection type optical fiber ribbon according to the present invention is for manufacturing the intermittent connection type optical fiber ribbon according to any one of the above-described (1) to (5), the method including: a step of coating a surface of the optical fiber with marking for recognition by arranging the plurality of optical fibers to be in parallel; a step of coating the plurality of arranged optical fibers with the adhesive resin to be in parallel; a smoothing step of smoothing the adhesive resin used in coating; a step of providing the connection portion by hardening the adhesive resin; and a step of providing the non-connection portion by intermittently forming a slit in a longitudinal direction between a part or the entirety of optical fibers, from the surface opposite to the resin coated surface.

In the intermittent connection type optical fiber ribbon manufactured by the manufacturing method of the above-described (9), it is possible to make the sectional area smaller than that of the intermittent connection type optical fiber ribbon of the related art, and when the intermittent connection type optical fiber ribbon is used in the optical fiber cable or in the optical fiber code, it is possible to improve the density of the optical fiber cable or the optical fiber code.

(10) In the manufacturing method of an intermittent connection type optical fiber ribbon of the above-described (9), the smoothing step of smoothing smooths the adhesive resin by allowing the plurality of arranged optical fibers to pass through a dice-like rubbing member.

It is possible to easily smooth the surface even when the adhesive resin rises or irregularity occurs when coating the surface with the adhesive resin.

Detailed Description of Embodiments

Specific examples of the intermittent connection type optical fiber ribbon, the optical fiber cable, and the optical fiber code according to embodiments of the present invention will be described with reference to the drawings hereinafter.

In addition, the present invention is not limited to the examples, is illustrated by the range of claims, and meanings equivalent to those within the range of claims and all of the changes within the range are included.

First Embodiment

First, an intermittent connection type optical fiber ribbon according to a first embodiment will be described with reference to the drawings. FIG. 1A is a sectional view illustrating an example of the intermittent connection type optical fiber ribbon according to the first embodiment. FIG. 1B is a plan view illustrating an example of the intermittent connection type optical fiber ribbon according to the first embodiment, and is a view illustrating a state where a non-connection portion is widened in an arrange direction.

As illustrated in FIGS. 1A and 1B, an intermittent connection type optical fiber ribbon 10 according to the first embodiment is arranged to be in parallel as at least a part of a plurality (12 in the examples of FIGS. 1A and 1B) of optical fibers 11A to 11L come into contact with each other. The optical fibers 11A to 11L are single-core covering optical fibers including a glass fiber 1 and two-layer covering layers 2a (inner covering layer) and 2b (outer covering layer) which cover the glass fiber 1. In addition, a Young's modulus of the covering layer 2a may be equal to or less than 0.5 MPa. By setting the Young's modulus of the inner covering layer 2a to be equal to or less than 0.5 MPa, it is possible to suppress deterioration of lateral pressure characteristics due to reduction of the thickness of the covering layers (2a and 2b) of the optical fibers 11A to 11L.

An outer diameter dimension A of the optical fibers 11A to 11L is equal to or less than 0.22 mm, and for example, the diameter of the glass fiber of the optical fibers 11A to 11L is 0.125 mm, and the diameter of the outer covering layer 2b is 0.20±0.02 mm. In addition, in the optical fibers 11A to 11L, the covering layer 2b is colored with colors different from each other in order to make it possible to identify the optical fibers from each other, or may include a coloring layer at an outer circumference of the covering layer 2b.

In addition, a part of the surfaces of the plurality of optical fibers 11A to 11L which are arranged to be in parallel is coated with an adhesive resin 3 for connecting the optical fibers to each other, and the optical fibers 11A to 11L are arranged to be arranged in a shape of a tape. The adhesive resin 3 is, for example, an ultraviolet ray hardening type resin or a thermosetting type resin. In addition, it is preferable that the adhesive resin 3 is a resin having excellent peeling properties in order to make work for separating single cores of the optical fibers 11A to 11L easy.

Areas which are coated with the adhesive resin 3 are, for example, as illustrated in FIG. 1A, only lower portions of the wires which link top portions of the optical fibers 11A to 11L to each other. Accordingly, it is possible to suppress the sectional area of a connection portion 4 with the adhesive resin 3 so as to be small. Since it is possible to reduce the sectional area of the connection portion 4, for example, it is possible to suppress the thickness of the intermittent connection type optical fiber ribbon 10 so as to be equal to or less than 0.26 mm. By suppressing the thickness of the intermittent connection type optical fiber ribbon 10, it is possible to improve the density of the optical fiber cable or the optical fiber code which uses the intermittent connection type optical fiber ribbon 10.

As described above, in the intermittent connection type optical fiber ribbon 10, the connection portion 4 in which adjacent optical fibers are connected to each other and a non-connection portion 5 in which the adjacent optical fiber wires are not connected to each other are intermittently provided in the longitudinal direction with the adhesive resin 3 used in coating. In addition, the connection portion 4 connected with the adhesive resin 3 is provided such that an inter-center distance (hereinafter, referred to as inter-core pitch) P of the adjacent optical fibers in the intermittent connection type optical fiber ribbon 10 becomes 0.20±0.03 mm.

In addition, FIG. 1B illustrates a state where the non-connection portion 5 of the intermittent connection type optical fiber ribbon 10 is widened in the arrange direction, but as illustrated in FIG. 1A, by setting a state where the optical fibers of the non-connection portion 5 are in contact with each other, it is possible to make the width of the intermittent connection type optical fiber ribbon 10 the minimum value.

By the above-described configuration, in the intermittent connection type optical fiber ribbon 10, it is possible to make the sectional area smaller than that of the intermittent connection type optical fiber ribbon of the related art.

In addition, at the time of intermediate branching in the optical fiber cable which uses the plurality of intermittent connection type optical fiber ribbons 10, in order to make it possible to easily recognize the intermittent connection type optical fiber ribbon 10, marking may be performed on at least one of the adhesive resin 3 and the optical fibers 11A to 11L. In addition, when there is a marking on the adhesive resin 3, when mounting the optical fibers 11A to 11L on the optical fiber code or on the optical fiber cable, there is a possibility that the marking disappears due to friction or the like. Therefore, it is preferable that the marking is performed on the optical fibers 11A to 11L.

Second Embodiment

Next, an intermittent connection type optical fiber ribbon according to a second embodiment will be described with reference to the drawings. FIG. 2A is a sectional view illustrating an example of the intermittent connection type optical fiber ribbon according to the second embodiment. FIG. 2B is a plan view illustrating an example of the intermittent connection type optical fiber ribbon according to the second embodiment, and is a view illustrating a state where the non-connection portion is widened in the arrange direction. In addition, areas similar to those of the configuration of the intermittent connection type optical fiber ribbon 10 of the first embodiment will be given the same reference numbers, and the description thereof will be omitted.

As illustrated in FIGS. 2A and 2B, in an intermittent connection type optical fiber ribbon 20, the non-connection portion 5 is not provided in a longitudinal direction between two cores of at least a part of the optical fiber. For example, in the examples of FIGS. 2A and 2B, the non-connection portion 5 is not provided between each of optical fibers 21A and 21B, 21C and 21D, 21E and 21F, 21G and 21H, 21I and 21J, and 21K and 21L.

In addition, FIG. 2B illustrates a state where the non-connection portions 5 of the intermittent connection type optical fiber ribbon 20 is widened in the arrange direction, but as illustrated in FIG. 2A, by setting a state where the optical fibers of the non-connection portion 5 are in contact with each other, it is possible to make the width of the intermittent connection type optical fiber ribbon 20 the minimum value.

Even in the intermittent connection type optical fiber ribbon having the above-described configuration, similar to the configuration of the intermittent connection type optical fiber ribbon 10 of the first embodiment, the outer diameter dimension of the optical fibers 21A to 21L is equal to or less than 0.22 mm, and an inter-center distance of the adjacent optical fibers is 0.20±0.03 mm.

(Manufacturing Method 1 of Intermittent Connection Type Optical Fiber Ribbon)

A coating method of the adhesive resin 3 in a manufacturing method 1 of the intermittent connection type optical fiber ribbons 10 and 20 according to the first and second embodiments will be described using an example of coating the intermittent connection type optical fiber ribbon 10 of the first embodiment with the adhesive resin 3, with reference to FIG. 3.

As illustrated in FIG. 3, 11 dispensers (adhesive resin supply device) 6 are installed in a tape width direction between each of the optical fibers 11A to 11L. In addition, by periodically applying a pressure to the dispenser 6, an adhesive resin 8 is discharged from a nozzle 7, and a part between a predetermined optical fibers is intermittently coated with the adhesive resin 3. As the adhesive resin 3 used in coating is hardened, the adjacent optical fibers are intermittently connected to each other. In this manner, the intermittent connection type optical fiber ribbon 10 of 12 cores illustrated in FIGS. 1A and 1B is manufactured. For example, by using the ultraviolet ray hardening type resin as the adhesive resin 3, by irradiating the resin after the coating with an ultraviolet ray, it is possible to harden the adhesive resin 3. In a case of FIG. 3, in the connection portion 4 of the intermittent connection type optical fiber ribbon 10, only one surface (side surface) of the plurality of optical fibers 11A to 11L in a state of being arranged to be in parallel is connected with the adhesive resin 3.

In addition, when control of combination or discharge timing of the nozzle 7 through which the adhesive resin 8 is discharged is changed, it is also possible to manufacture the intermittent connection type optical fiber ribbon 20 according to the second embodiment (which is configured with the plurality of optical fibers 21A to 21L).

In addition, in a case where the outer diameter dimension of the optical fibers 11A to 11L is small, when the plurality of dispensers 6 are horizontally disposed in one row, an interval between the adjacent dispensers 6 becomes narrow, the disposition becomes difficult, and thus, the dispensers 6 may be disposed to be shifted in the longitudinal direction of the optical fibers 11A to 11L. For example, the plurality of dispensers 6 may be disposed to be shifted to be different from each other in a zigzag manner.

(Manufacturing Method 2 of Intermittent Connection Type Optical Fiber Ribbon)

Figure 4:
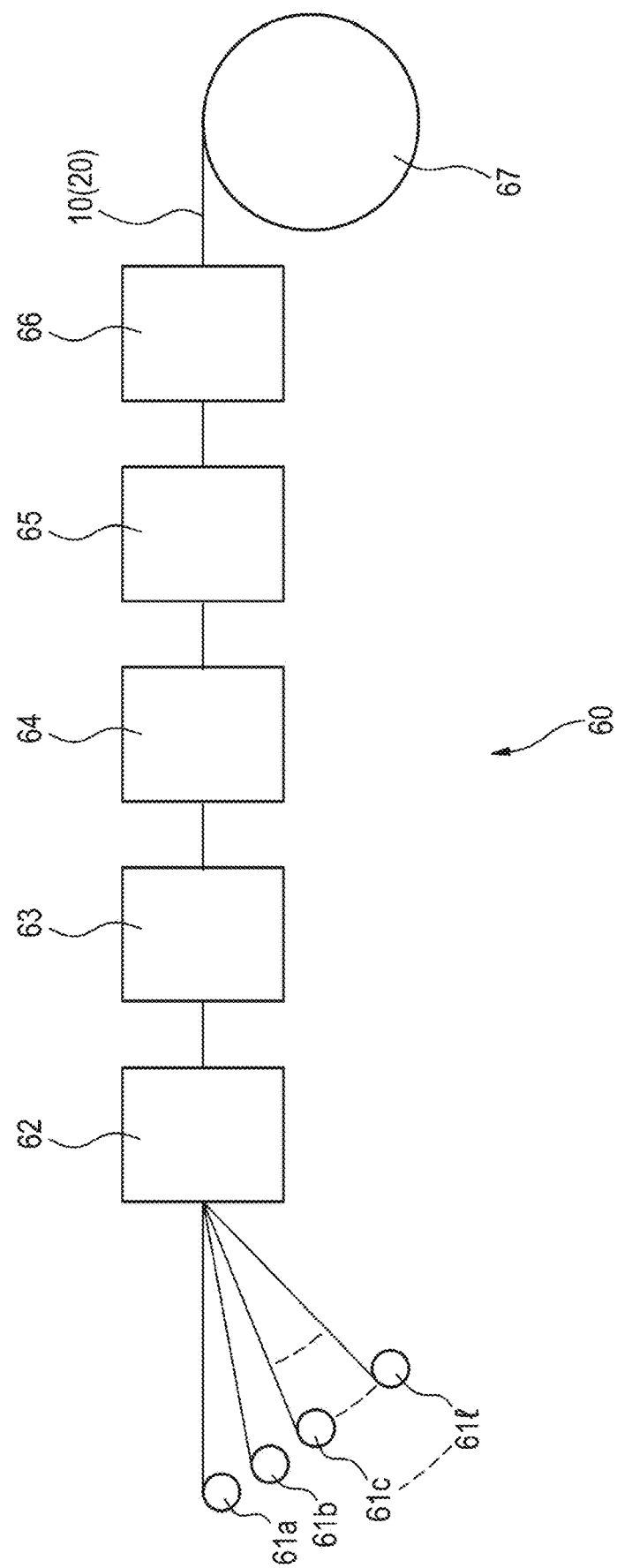
FIG. 4 is a schematic configuration view of a manufacturing device which is used as one example of the manufacturing method of the intermittent connection type optical fiber ribbon according to the first embodiment or the second embodiment.
Figure 5:
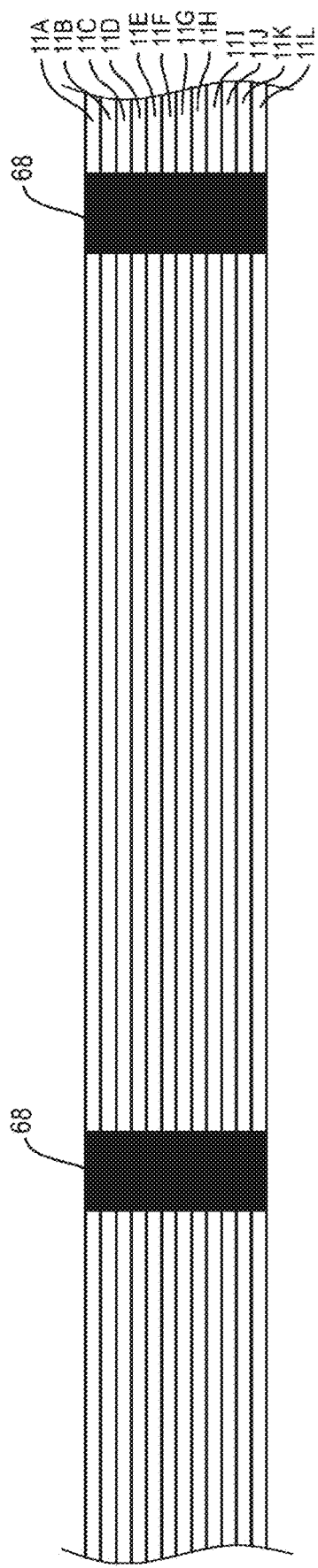
FIG. 5 is a schematic view illustrating a state where the plurality of optical fibers are arranged and the surface is coated with marking for recognition in the manufacturing device of FIG. 4.
Figure 6:
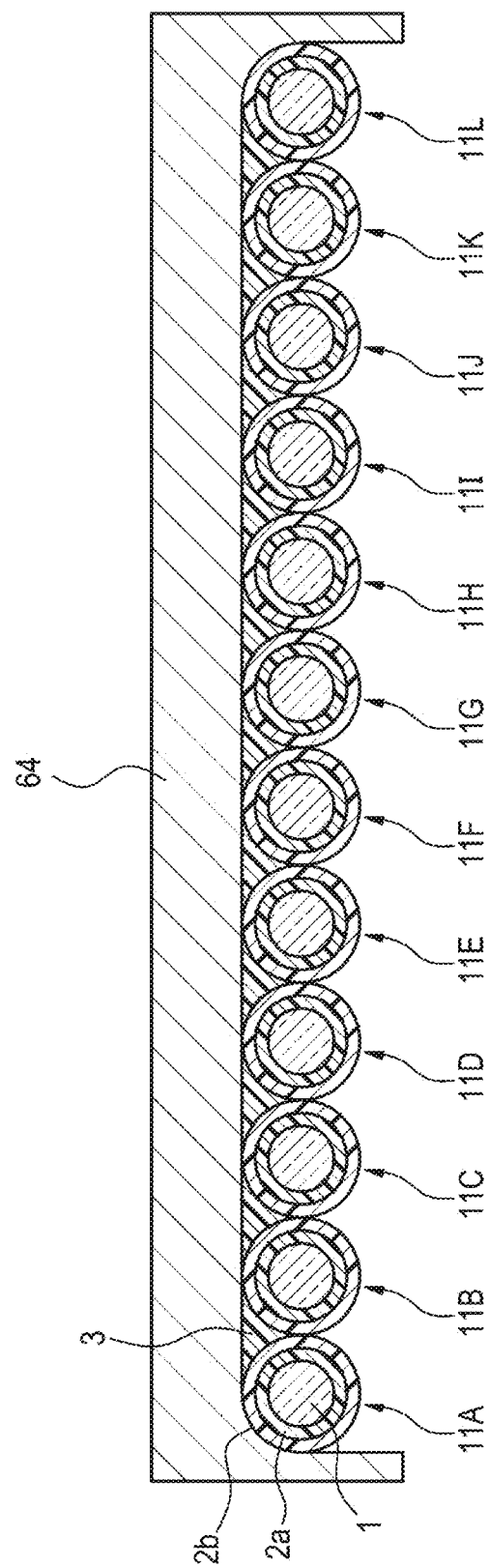
FIG. 6 is a schematic view illustrating a dice-like rubbing member in the manufacturing device of FIG. 4.
Figure 7:
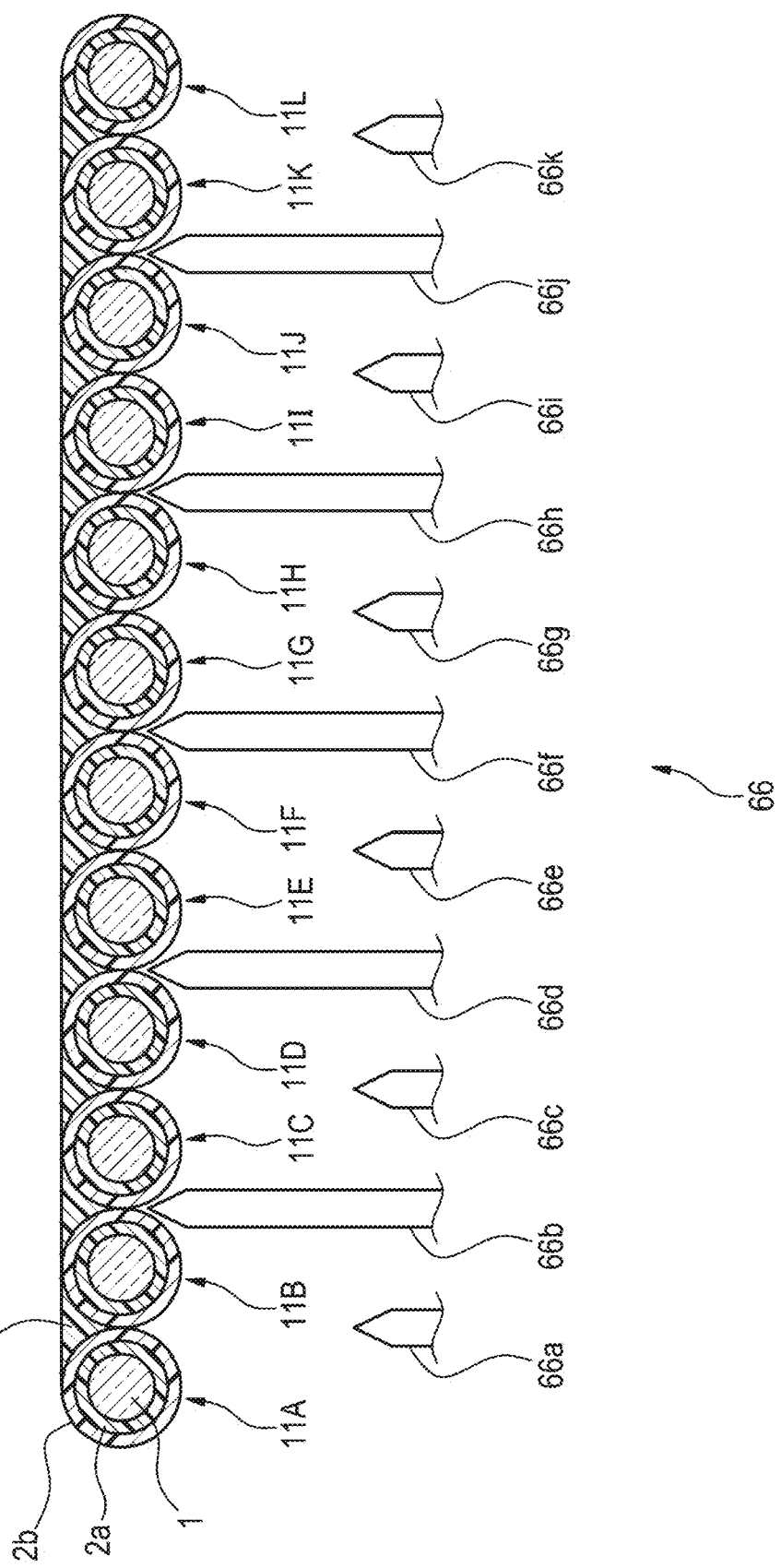
FIG. 7 is a schematic view illustrating a slit processing portion in the manufacturing device of FIG. 4.

Next, a manufacturing method 2 of the intermittent connection type optical fiber ribbons 10 and 20 according to the first and second embodiments will be described with reference to FIGS. 4 to 7. FIG. 4 is a schematic configuration view of the manufacturing device which is used in the manufacturing method 2 of the intermittent connection type optical fiber ribbon. FIG. 5 is a schematic view illustrating a state where a surface on which the plurality of optical fibers are arranged is coated with the marking for recognition. FIG. 6 is a schematic view illustrating a dice-like rubbing member in the manufacturing device of FIG. 4. FIG. 7 is a schematic view illustrating a slit processing portion in the manufacturing device of FIG. 4.

A manufacturing device 60 illustrated in FIG. 4 is configured with supply bobbins 61a to 61l, an ink jet printer 62, a coating device 63, a rubbing member 64, an adhesive resin hardening device 65, a slit processing portion 66, and a winding bobbin 67.

In the following description, manufacturing of the intermittent connection type optical fiber ribbon 10 according to the first embodiment will be described, but the intermittent connection type optical fiber ribbon 20 according to the second embodiment can also be manufactured similarly.

As illustrated in FIG. 5, by setting a state where the optical fibers 11A to 11L supplied from each of the supply bobbins 61a to 61l are arranged to be in parallel, surfaces of each of the optical fibers 11A to 11L are coated with, for example, a bar-like marking 68 by the ink jet printer 62 or the like. Since the surfaces are coated with the marking 68 before coating the adhesive resin 3, the marking 68 exists on a layer below the adhesive resin 3, and when mounting the optical fibers 11A to 11L on the optical fiber code or on the optical fiber cable, it is possible to prevent the marking 68 from disappearing due to friction or the like.

Next, by the coating device 63, one surface (side surface) of the plurality of optical fibers 11A to 11L in a state of being arranged to be in parallel is coated with the adhesive resin 3 as a resin coated surface. Unlike the coating method of the adhesive resin 3 in the manufacturing method 1 of the intermittent connection type optical fiber ribbon, the coating device 63 performs coating such that all of the optical fibers 11A to 11L adheres with the adhesive resin 3. By the smoothing process which will be described later, the adhesive resin 3 of the resin coated surface extends and is smoothed, and thus, the coating device 63 may perform the coating with the adhesive resin not being limited to a configuration in which the dispenser 6 is installed between each of the optical fibers 11A to 11L, as illustrated in FIG. 3.

The optical fibers 11A to 11L coated with the adhesive resin 3 allow the dice-like rubbing member 64 to pass therethrough as illustrated in FIG. 6 (smoothing process). By allowing the rubbing member 64 to pass, the adhesive resin 3 with which the optical fibers 11A to 11L is coated extends and the surface thereof is smoothed. Accordingly, when performing the coating with the adhesive resin 3 by the coating device 63, it is possible to easily smooth the surface even when the adhesive resin 3 rises or irregularity occurs.

Next, by using the adhesive resin hardening device 65, the adhesive resin of the surface layers of the optical fibers 11A to 11L is hardened. In a case where the adhesive resin 3 is, for example, the ultraviolet ray hardening type resin, the adhesive resin hardening device 65 is an ultraviolet ray irradiating device or the like.

Next, as illustrated in FIG. 7, from the surface which is not coated with the adhesive resin 3 in the optical fibers 11A to 11L, by intermittently inserting blades 66a to 66k (for example, a rotating blade in which round teeth are installed in a roller) between predetermined optical fibers at a predetermined insertion pattern and timing, slits are intermittently formed with respect to the adhesive resin 3 between the optical fibers. The areas at which the slits are formed become a non-connection portion at which the adjacent optical fibers are not connected to each other with the adhesive resin 3. Since the blades 66a to 66k are inserted from the surface which is not coated with the adhesive resin 3, a guide effect by a cavity between the optical fibers is likely to be obtained. Therefore, the position at which the slit is formed is shifted, and it is possible to suppress a defect that the optical fibers 11A to 11L are damaged or a defect that the slit cannot be reliably formed.

As described above, the intermittent connection type optical fiber ribbon 10 is manufactured. In addition, for example, by changing the insertion pattern and the timing of the blades 66a to 66k, when changing the area at which the slit is formed, it is possible to manufacture the intermittent connection type optical fiber ribbon 20 according to the second embodiment. In addition, the manufactured intermittent connection type optical fiber ribbon 10 (20) is wound by the winding bobbin 67.

Figure 8:
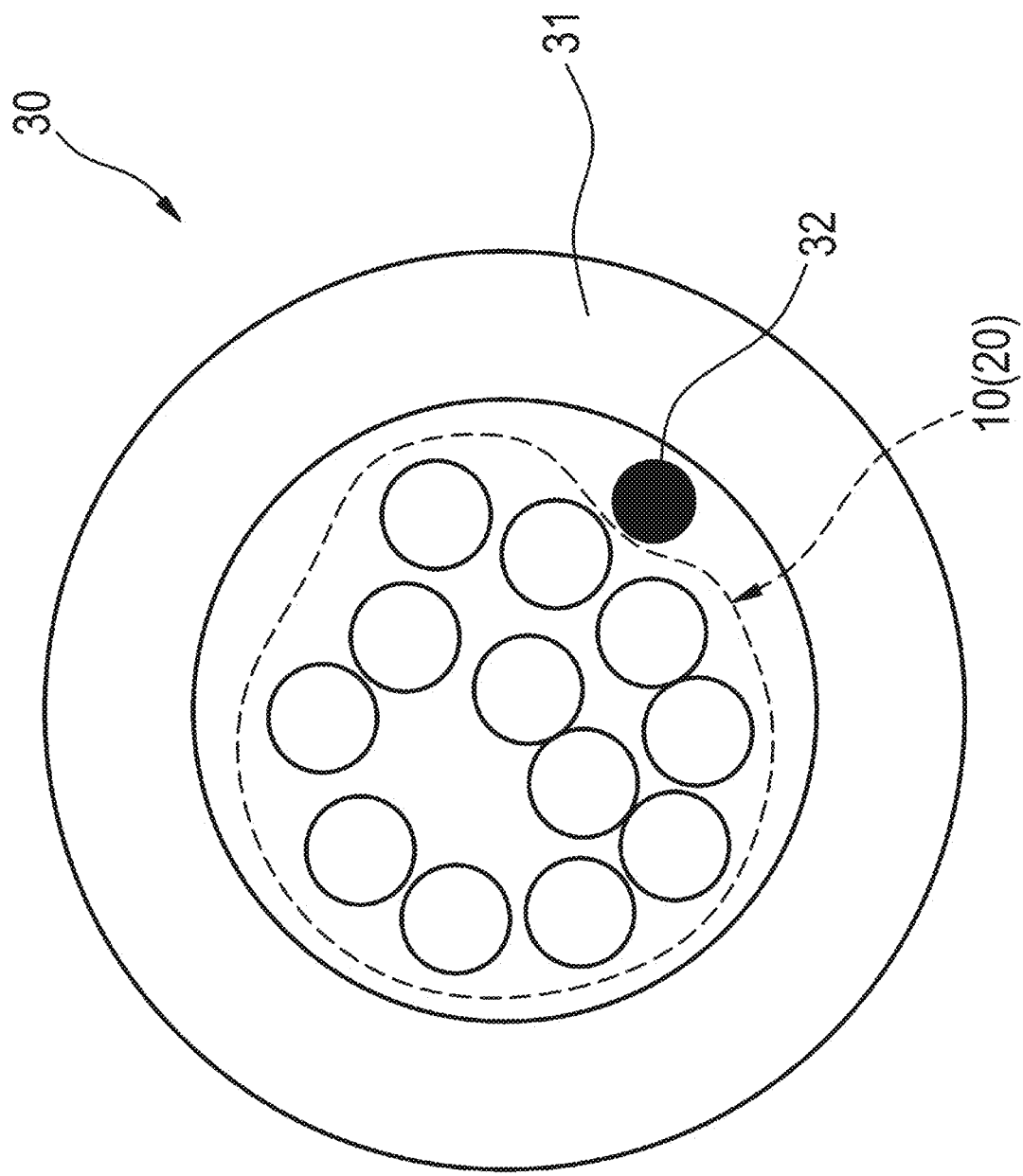
FIG. 8 is a sectional view illustrating an example of an optical fiber code in which the intermittent connection type optical fiber ribbon according to the first embodiment or the second embodiment is used.

Next, the optical fiber code according to the embodiment will be described with reference to FIG. 8. FIG. 8 is a sectional view illustrating an example of the optical fiber code which uses the intermittent connection type optical fiber ribbon according to the first embodiment or the second embodiment.

As illustrated in FIG. 8, an optical fiber code 30 includes a jacket 31 and the intermittent connection type optical fiber ribbon 10 (20). In addition, the intermittent connection type optical fiber ribbon 10 (20) is covered with, for example, the cylindrical jacket 31. In addition, the intermittent connection type optical fiber ribbon 10 (20) may be bound by an inclusion 32 by Kevlar or the like.

Figure 9:
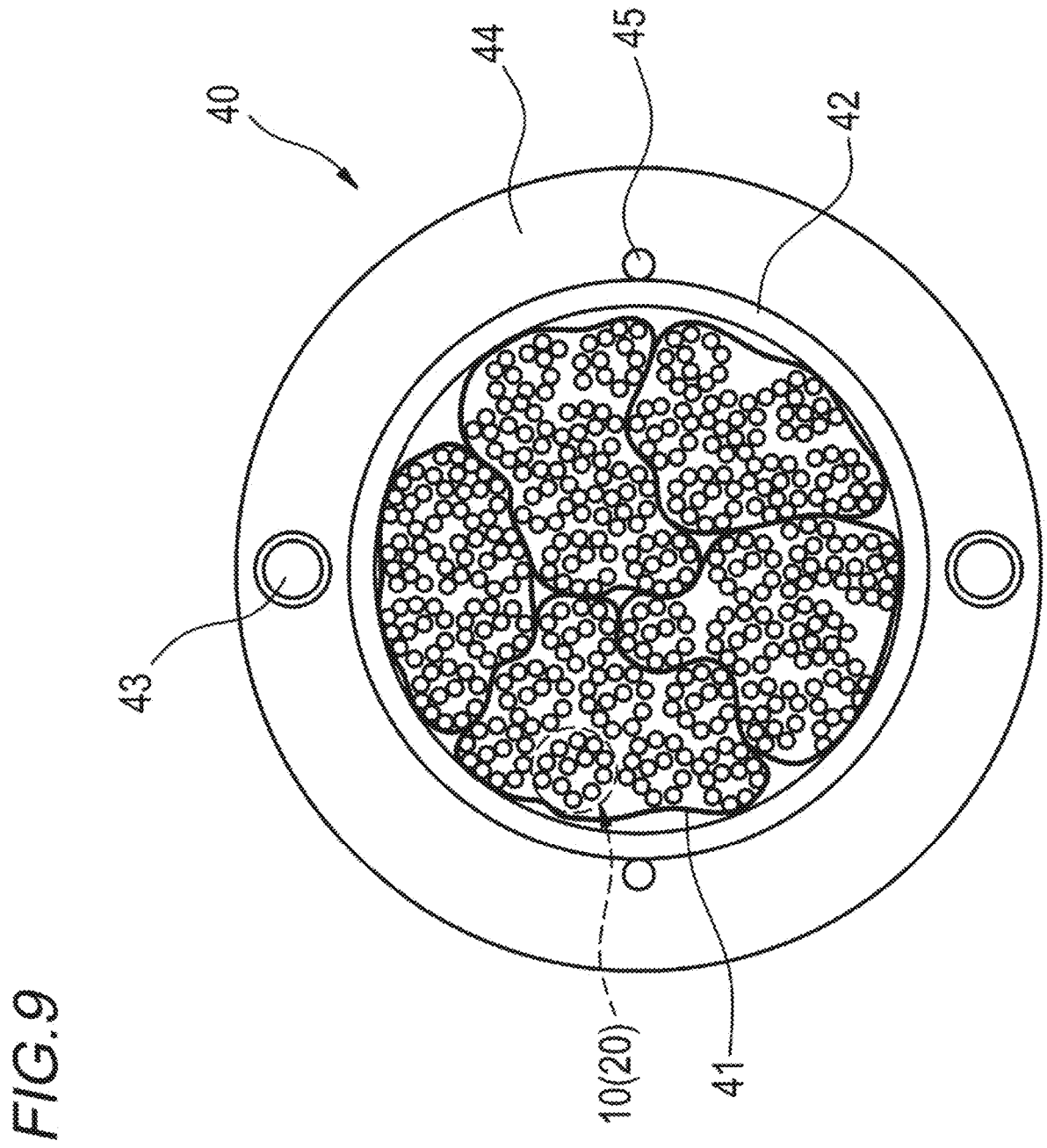
FIG. 9 is a sectional view illustrating an example of a slotless type optical fiber cable in which the intermittent connection type optical fiber ribbon according to the first embodiment and the second embodiment is used.
Figure 10:
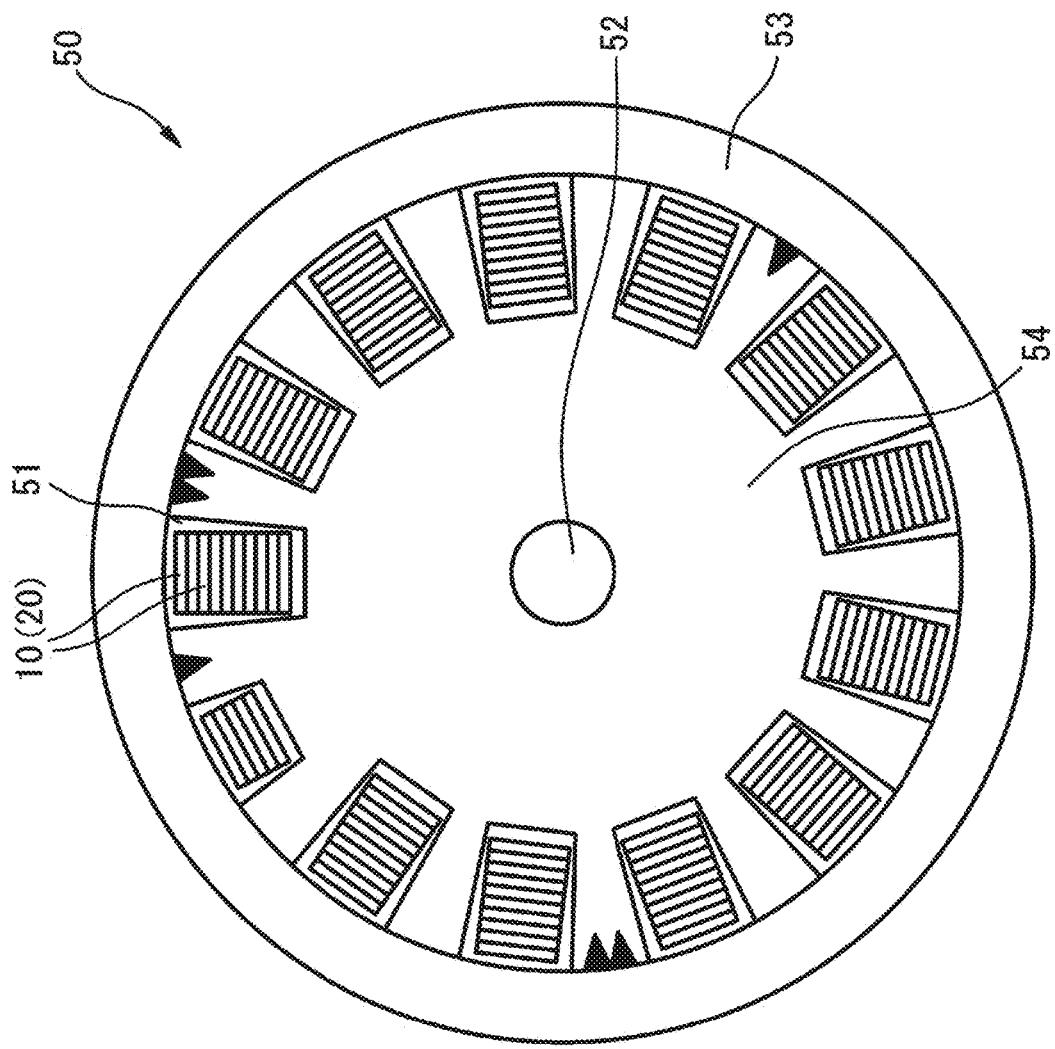
FIG. 10 is a sectional view illustrating an example of a slot type optical fiber cable in which the intermittent connection type optical fiber ribbon according to the first embodiment and the second embodiment is used.

Next, with reference to FIGS. 9 and 10, the optical fiber cable according to the embodiment will be described. FIG. 9 is a view illustrating an example of the slotless type optical fiber cable which uses the intermittent connection type optical fiber ribbon 10 of the first embodiment. FIG. 10 is a view illustrating an example of the tape slot type optical fiber cable which uses the intermittent connection type optical fiber ribbon 10 of the first embodiment.

The optical fiber cable illustrated in FIG. 9 is a slotless type optical fiber cable 40 including a cylindrical tube 42 and the plurality of intermittent connection type optical fiber ribbons 10. The plurality of intermittent connection type optical fiber ribbons 10 may be bound by an inclusion 41, such as an aramid fiber. In addition, the plurality of intermittent connection type optical fiber ribbons 10 may include markings different from each other. In addition, a structure in which the resin which becomes the tube 42 is extruded and formed around the intermittent connection type optical fiber ribbons 10 while twisting the plurality of bound intermittent connection type optical fiber ribbons 10, and the intermittent connection type optical fiber ribbon 10 is formed being covered with a jacket 44 together with a tension member 43. In addition, in a case where waterproof properties are required, absorptive yarn may be inserted into the tube 42. As the resin which becomes the cylindrical tube 42, for example, a hardening material, such as PBT or HDPE, is used. In addition, 45 indicates a tear string.

The optical fiber cable illustrated in FIG. 10 is a tape slot type optical fiber cable 50 including a slot rod 54 having a plurality of slot grooves 51, and the plurality of intermittent connection type optical fiber ribbons 10. The tape slot type optical fiber cable 50 has a structure in which the plurality of slot grooves 51 are provided in a radial shape in the slot rod 54 having a tension member 52 at the center thereof. The plurality of intermittent connection type optical fiber ribbons 10 are accommodated in a state of being respectively layered on the plurality of slot grooves 51. The plurality of intermittent connection type optical fiber ribbons 10 may have markings different from each other. In addition, a jacket 53 is formed around the slot rod 54.

In addition, the intermittent connection type optical fiber ribbon 10 which is used in the optical fiber cables 40 and 50 may be the intermittent connection type optical fiber ribbon 20 of the second embodiment.

Above, in the intermittent connection type optical fiber ribbon 10 (20) according to the first embodiment and the second embodiment which are described in detail, at least a part of the plurality of optical fibers 11A to 11L (21A to 21L) in a state of being arranged to be in parallel come into contact with each other, and between a part or the entirety of the optical fibers, the connection portion 4 at which the adjacent optical fibers are connected to each other with the adhesive resin 3, and the non-connection portion 5 at which the adjacent optical fibers are not connected to each other with the adhesive resin 3, are intermittently provided in the longitudinal direction. In addition, the outer diameter dimension of the optical fibers 11A to 11L (21A to 21L) is equal to or less than 0.22 mm, and the inter-center distance of the adjacent optical fibers is 0.20±0.03 mm.

Accordingly, the intermittent connection type optical fiber ribbon 10 (20) according to the first embodiment and the second embodiment can make the sectional area smaller than that of the intermittent connection type optical fiber ribbon of the related art.

As described above, the optical fiber code 30 including the intermittent connection type optical fiber ribbons 10 (20) which can make the sectional area smaller than that of the intermittent connection type optical fiber ribbon of the related art, can make the outer diameter thereof smaller than that of the optical fiber code of the related art. In addition, it is possible to improve the density to be higher than that of the optical fiber code 30.

In addition, the slotless type optical fiber cable 40 which uses the plurality of intermittent connection type optical fiber ribbons 10 (20) can make the density higher than that of the optical fiber cable of the related art. For example, in 432 core optical fiber cables which use the intermittent type optical fiber ribbon (the diameter of the core is 0.25 mm and the inter-core pitch is 0.25 mm) of the related art, 36 intermittent connection type optical fiber ribbons having 12 cores are mounted in the cylindrical tube. Meanwhile, the optical fiber cable 40 having the same outer diameter as that of the optical fiber cable of the related art can mount 63 intermittent connection type optical fiber ribbons 10 (20) having 12 cores according to the first embodiment or the second embodiment, and the number of optical fibers can be 756. In addition, when the number of cores is the same, the outer diameter thereof can be made smaller than that of the optical fiber cable of the related art.

In addition, in the optical fiber cable 50 which uses the intermittent connection type optical fiber ribbon 10 (20), similarly, the number of optical fibers can increase to be greater than that of the optical fiber cable having the same outer diameter on which the intermittent connection type optical fiber ribbon of the related art is mounted. In other words, the tape slot type optical fiber cable 50 of the embodiment can make the density higher than that of the optical fiber cable of the related art. In addition, when the number of cores is the same, the outer diameter thereof can be made smaller than that of the optical fiber cable of the related art.

EXAMPLE

Next, Example and Comparative Examples 1 and 2 will be described.

Comparative Example 1

Figure 11:
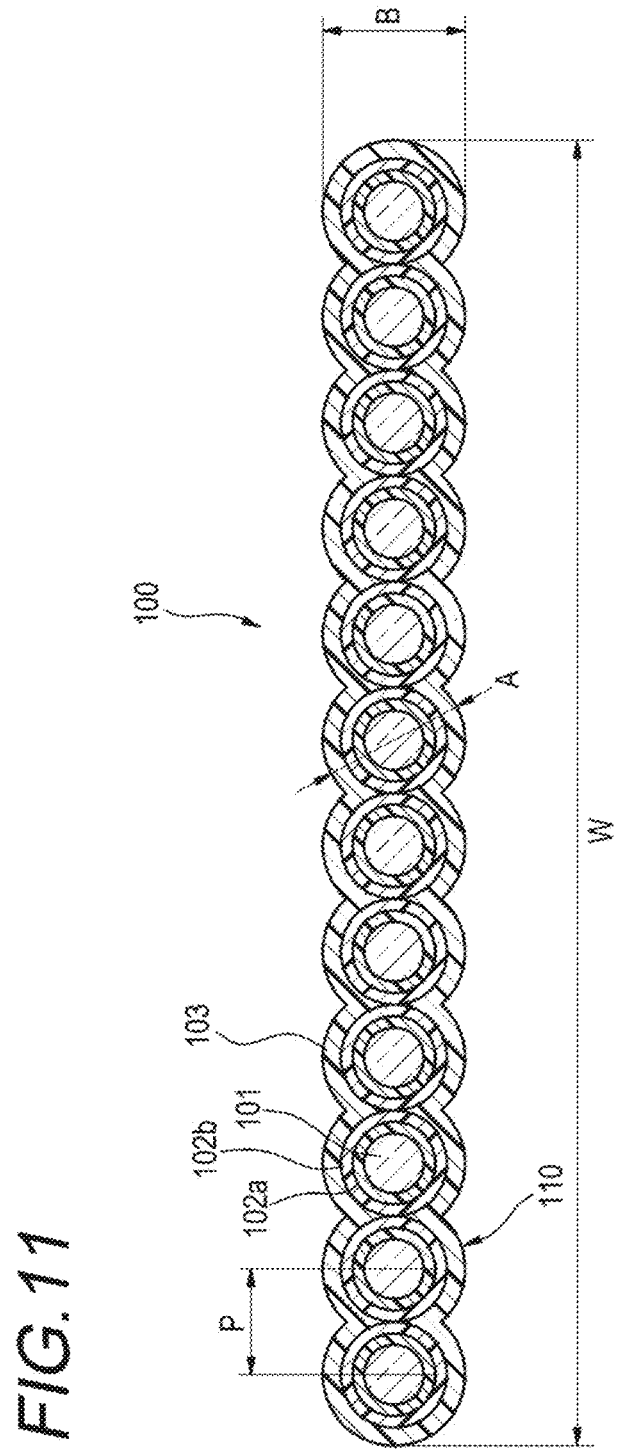
FIG. 11 is a sectional view illustrating an intermittent connection type optical fiber ribbon of Comparative Example 1.

As illustrated in FIG. 11, an intermittent connection type optical fiber ribbon 100 of Comparative Example 1 has a structure in which optical fibers 110 having an outer diameter of 0.25 mm come into contact with each other and are arranged to be in parallel, and the periphery thereof is coated with an adhesive resin 103. The inter-core pitch P of the intermittent connection type optical fiber ribbon 100 is 0.25 mm, and the width W of the intermittent connection type optical fiber ribbon 100 is 3.04 mm. In addition, the structure of the optical fiber 110 is a single-core covering optical fiber including a glass fiber 101 and two-layer covering layers 102a (inner covering layer) and 102b (outer covering layer) which cover the glass fiber 101.

When the intermittent connection type optical fiber ribbon 100 is simply approximated as an aggregate of the optical fiber, and a thickness B (outer diameter A) of the aggregate is 0.285 mm, the sectional area of the intermittent connection type optical fiber ribbon 100 is 0.765 mm$^2$.

Comparative Example 2

Figure 12:
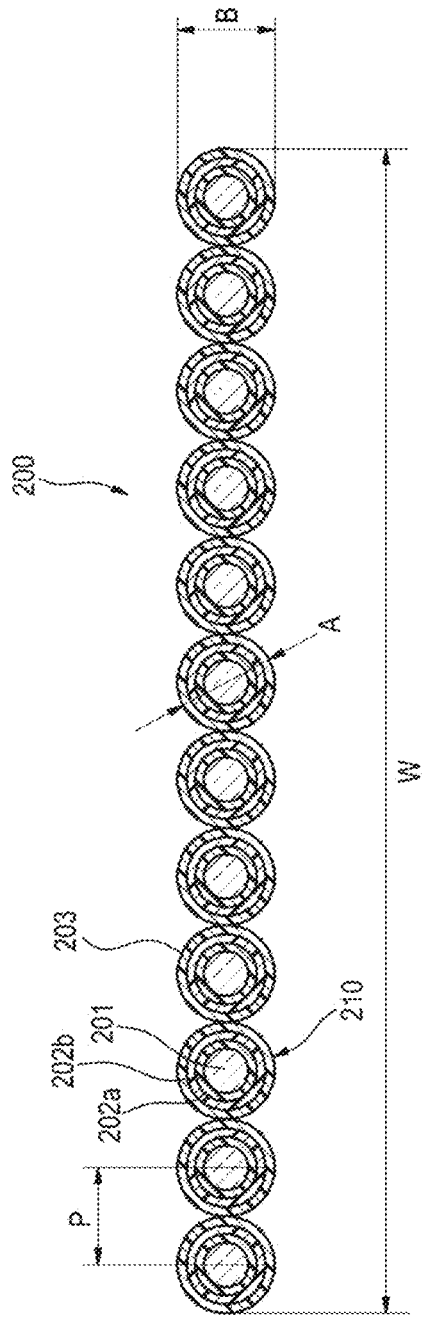
FIG. 12 is a sectional view illustrating an intermittent connection type optical fiber ribbon of Comparative Example 2.

As illustrated in FIG. 12, an intermittent connection type optical fiber ribbon 200 of Comparative Example 2 has a structure of being arranged to be in parallel after coating the periphery of each of the optical fibers having an outer diameter of 0.20 mm with an adhesive resin 203, and in which the inter-core pitch P is 0.25 mm. The width W of the intermittent connection type optical fiber ribbon 200 is 3.00 mm. In addition, the structure of an optical fiber 210 is a single-core covering optical fiber including a glass fiber 201 and two-layer covering layers 202a (inner covering layer) and 202b (outer covering layer) which cover the glass fiber 201.

When the intermittent connection type optical fiber ribbon 200 is simply approximated as an aggregate of the optical fiber, and a thickness B (outer diameter A) of the aggregate is 0.25 mm, the sectional area of the intermittent connection type optical fiber ribbon 200 is 0.589 mm$^2$, and a decrease rate is approximately 23% compared to Comparative Example 1 by the cross-sectional ratio.

Example

Regarding the intermittent connection type optical fiber ribbon of Example, in the intermittent connection type optical fiber ribbon 10 of the first embodiment illustrated in FIGS. 1A and 1B, the outer diameter A of the optical fibers 11A to 11L is 0.20 mm, and the inter-core pitch P is 0.20 mm. At this time, the width of the intermittent connection type optical fiber ribbon 10 is 2.40 mm.

In the intermittent connection type optical fiber ribbon 10 of Example, when a sectional shape of the adhesive resin 3 is simply approximated by an isosceles triangle, the sectional area thereof is 0.437 mm$^2$. A decrease rate is approximately 43% compared to Comparative Example 1 by the cross-sectional ratio.

In Comparative Example 1, while the outer diameter of the optical fiber is 0.25 mm which is generally used, in Comparative Example 2 and Example, the optical fiber which can be mounted to the optical fiber cable with high density and of which the outer diameter is 0.20 mm which is a small outer diameter, is used. The sectional area of the intermittent connection type optical fiber ribbon is made in Comparative Example 2 or Example in which the outer diameter of the optical fiber is small, smaller compared to that in Comparative Example 1, but when the decrease rate of the sectional area of Example is approximately 43%, the decrease rate increases to be greater than approximately 23% which is the decrease rate of the sectional area of Comparative Example 2.

In this manner, even when the outer diameters of the optical fibers have the same size, in Example which is the structure of the intermittent connection type optical fiber ribbon 10 of the first embodiment, it is possible to make the sectional area smaller than that of Example 2 which is the intermittent connection type optical fiber ribbon of the related art. In addition, even when the structure of Example is the structure of the intermittent connection type optical fiber ribbon 20 according to the second embodiment illustrated in FIGS. 2A and 2B, the sectional area is approximately 0.457 mm$^2$, and it is possible to make the sectional area smaller than that of Comparative Example 2.

The invention claimed is:
1. An intermittent connection type optical fiber ribbon in which at least a part of a plurality of optical fibers in a state of being arranged to be in parallel come into contact with each other, and between a part or the entirety of the optical fibers, a connection portion at which the adjacent optical fibers are connected to each other with an adhesive resin, and a non-connection portion at which the adjacent optical fibers are not connected to each other with the adhesive resin, are intermittently provided in the longitudinal direction,
wherein an outer diameter dimension of the optical fiber is equal to or less than 0.22 mm, and an inter-center distance of the adjacent optical fibers is 0.20±0.02 mm, wherein at least a part of the outer periphery of the optical fiber has no adhesive resin attached thereto, wherein the adjacent optical fibers of the connection portion are in contact with each other.

2. The intermittent connection type optical fiber ribbon according to claim 1, wherein the thickness of the intermittent connection type optical fiber ribbon is equal to or less than 0.26 mm.

3. The intermittent connection type optical fiber ribbon according to claim 1, wherein marking is performed on at least one of the adhesive resin and the optical fiber.

4. The intermittent connection type optical fiber ribbon according to claim 1, wherein the optical fiber includes a glass fiber and two covering layers which cover the glass fiber, and wherein a Young's modulus of the inner covering layer of the two covering layers is equal to or less than 0.5 MPa.

5. The intermittent connection type optical fiber ribbon according to claim 1, wherein only a side surface of the intermittent connection type optical fiber ribbon is coated with the adhesive resin.

6. An optical fiber cable comprising:

a cylindrical tube; and the plurality of intermittent connection type optical fiber ribbons according to claim 1, wherein the plurality of intermittent connection type optical fiber ribbons are covered with the tube.

7. An optical fiber cable comprising:

a slot rod including a plurality of slot grooves; and the plurality of intermittent connection type optical fiber ribbons according to claim 1, wherein the plurality of intermittent connection type optical fiber ribbons are respectively accommodated in the slot grooves.

8. An optical fiber code comprising:

a jacket; and the intermittent connection type optical fiber ribbon according to claim 1, wherein the intermittent connection type optical fiber ribbon is covered with the jacket.

9. A manufacturing method of an intermittent connection type optical fiber ribbon is for manufacturing the intermittent connection type optical fiber ribbon according to claim 1, the method comprising:

a step of coating a surface of the optical fiber with marking for recognition by arranging the plurality of optical fibers to be in parallel;

a step of coating the plurality of arranged optical fibers with the adhesive resin;

a smoothing step of smoothing the adhesive resin used in coating;

a step of providing the connection portion by hardening the adhesive resin, the adjacent optical fibers of the connection portion being in contact with each other; and a step of providing the non-connection portion by intermittently forming a slit in a longitudinal direction between a part or the entirety of optical fibers, from the surface opposite to the resin coated surface.

10. The manufacturing method of an intermittent connection type optical fiber ribbon according to claim 9, wherein the smoothing step of smoothing smooths the adhesive resin by allowing the plurality of arranged optical fibers to pass through a dice-like rubbing member.

11. The intermittent connection type optical fiber ribbon according to claim 1, wherein, in the connection portion, no adhesive resin is on an inter-center line of the adjacent optical fiber.

12. The intermittent connection type optical fiber ribbon according to claim 1, wherein the adhesive resin are in only lower portions of lines which link top portions of the optical fibers to each other.

* * * * *